US011970965B2

(12) United States Patent
Fimml et al.

(10) Patent No.: US 11,970,965 B2
(45) Date of Patent: Apr. 30, 2024

(54) INTERNAL COMBUSTION ENGINE

(71) Applicant: INNIO Jenbacher GmbH & Co OG, Jenbach (AT)

(72) Inventors: Wolfgang Fimml, Maurach in Tirol (AT); Nikolaus Spyra, Innsbruck (AT); Stephan Laiminger, Kirchbichl (AT); Matthias Raibel, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/015,877

(22) PCT Filed: Jul. 14, 2020

(86) PCT No.: PCT/AT2020/060269
§ 371 (c)(1),
(2) Date: Jan. 12, 2023

(87) PCT Pub. No.: WO2022/011400
PCT Pub. Date: Jan. 20, 2022

(65) Prior Publication Data
US 2023/0265780 A1  Aug. 24, 2023

(51) Int. Cl.
F02B 19/10 (2006.01)
F02B 19/18 (2006.01)
F02B 19/12 (2006.01)

(52) U.S. Cl.
CPC .......... F02B 19/1095 (2013.01); F02B 19/18 (2013.01); F02B 19/12 (2013.01)

(58) Field of Classification Search
CPC .................................................. F02B 19/18
See application file for complete search history.

(56) References Cited

U.S. PATENT DOCUMENTS 5,222,993 A     6/1993  Crane
6,125,813 A *  10/2000  Louthan .................... F01C 1/22
                                                                  123/270

(Continued)

FOREIGN PATENT DOCUMENTS

EP    2998537 A1    3/2016
EP    3271561 A1    1/2018

(Continued)

OTHER PUBLICATIONS

PCT International Search Report and Written Opinion; Application No. PCT/AT2020/060269; dated Mar. 22, 2021; 27 pages.

Primary Examiner — John Kwon
(74) Attorney, Agent, or Firm — Fletcher Yoder, P.C.

(57) ABSTRACT

An internal combustion engine having a prechamber with first and second sub-chambers. The first sub-chamber has a prechamber gas valve and an igniter. The second sub-chamber has a plurality of first orifices to couple with a main combustion chamber. The second sub-chamber is coupled to the first sub-chamber via a direct connection or an indirection connection. The direct connection includes at least one second orifice, such as a plurality of second orifices. The indirect connection includes a third sub-chamber, wherein the third sub-chamber is coupled to the first sub-chamber by at least one third orifice (e.g., a plurality of third orifices), and the third sub-chamber is coupled to the second sub-chamber by at least one second orifice (e.g., a plurality of second orifices).

21 Claims, 4 Drawing Sheets

(56) References Cited

U.S. PATENT DOCUMENTS

| 9,316,144 | B2 | 4/2016 | Gruber | |
| 2007/0169737 | A1* | 7/2007 | Gong | H01T 13/467 123/637 |
| 2014/0083391 | A1 | 3/2014 | Gruber | |
| 2019/0072025 | A1* | 3/2019 | Rabhi | F02B 19/18 |

FOREIGN PATENT DOCUMENTS

| EP | 3303804 A1 | 4/2018 |
| EP | 3362658 A1 | 8/2018 |

* cited by examiner

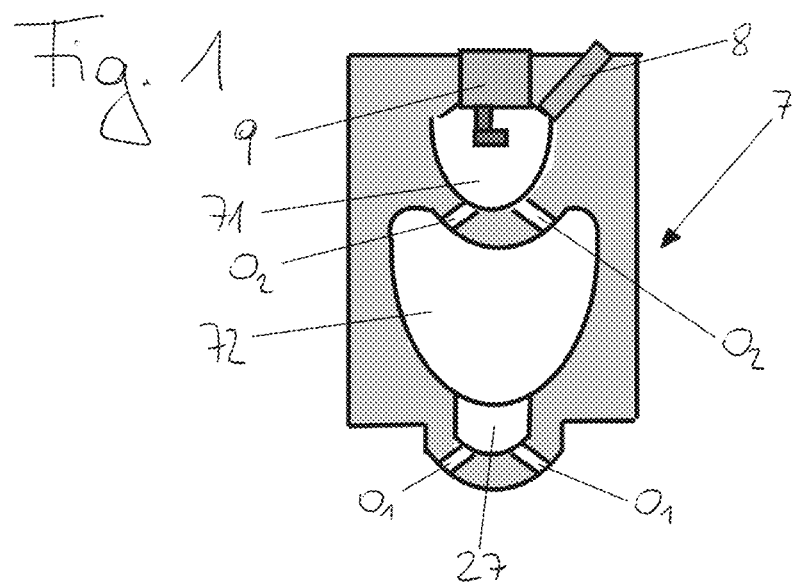
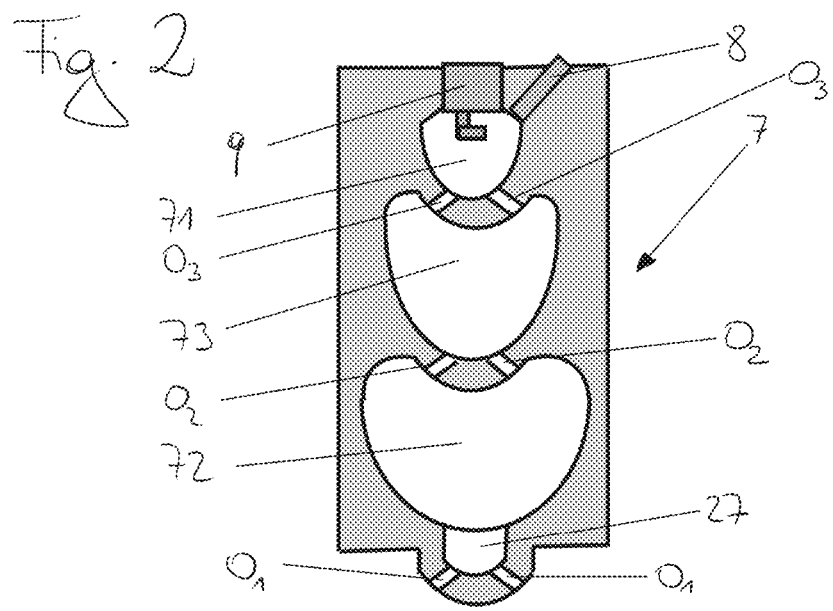

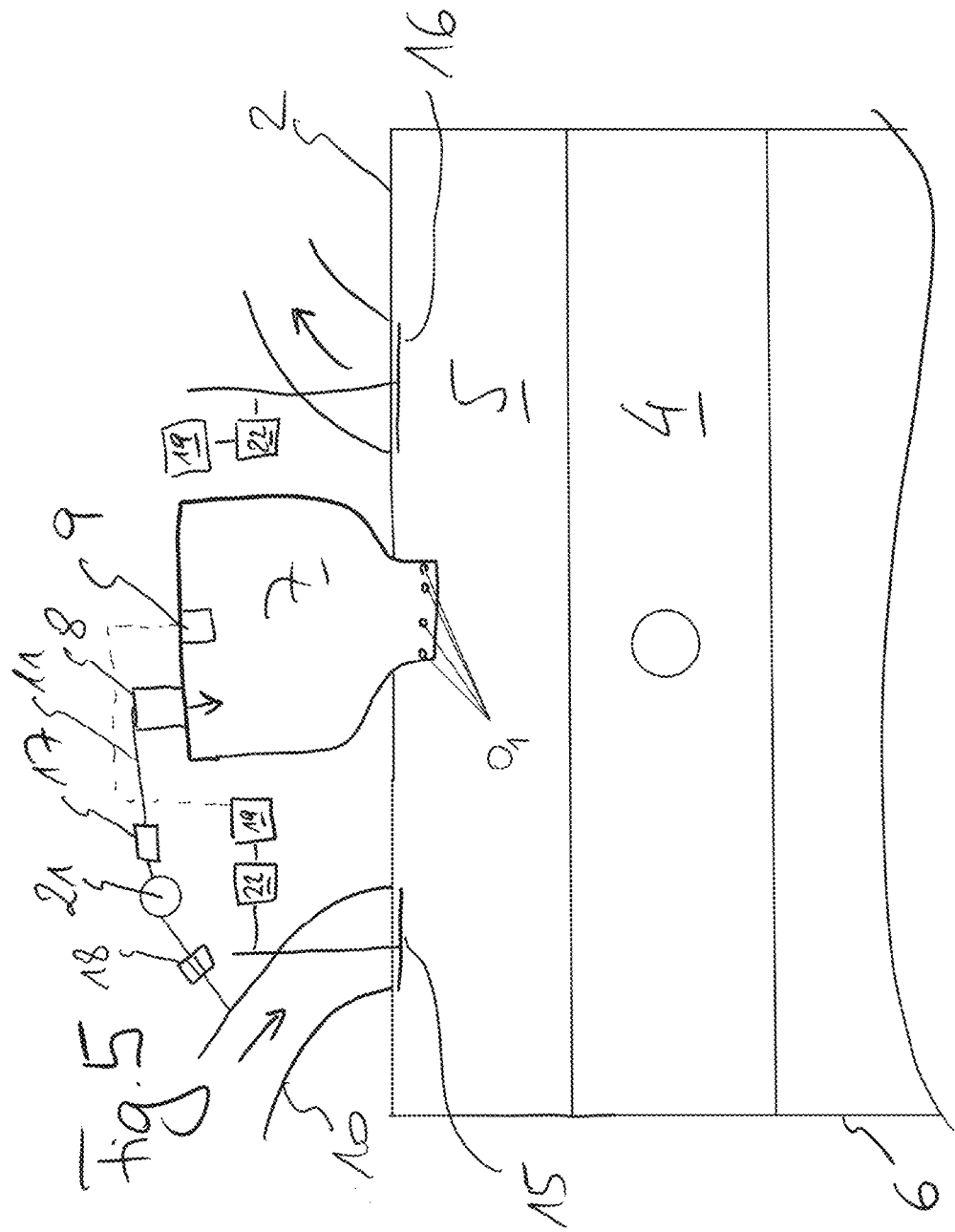

INTERNAL COMBUSTION ENGINE

CROSS-REFERENCE TO RELATED APPLICATION

This application is a National Stage entry from, and claims benefit of, PCT Application No. PCT/AT2020/060269, filed on Jul. 14, 2020; entitled "INTERNAL COMBUSTION ENGINE", which is herein incorporated by reference in its entirety.

BACKGROUND

The invention concerns an internal combustion engine having prechambers of the fuel-gas air mixture flushed type.

Parameter $\lambda$ characterizes a mixture of air and fuel gas with:
$\lambda=1$ denoting a stoichiometric mixture
$\lambda>1$ denoting a lean mixture and
$\lambda<1$ denoting a rich mixture The term "fuel gas" or "gas" can encompass fuel gas such as natural gas, hydrogen, ammonia, APG, biogas, landfill gas, sewage gas, etc.

In internal gas combustion engines having a cylinder with a relatively small displacement, direct ignition is prevalent. A gas-air mixture present inside the main combustion chamber is ignited by a spark plug protruding into the main combustion chamber. Together, with the concept of lean operation (use of a gas-air mixture with $\lambda>1$), a NOx fraction of the exhaust gas produced during operation can be held below legally proscribed values. It is also known to dilute a stoichiometric gas-air mixture with exhaust gas instead of additional air, such that the gas-air mixture has a $\lambda$ of about 1 and an exhaust gas fraction is present. The advantage of this measure is the fact that a three-way-catalysator can be utilized and an emission of pollutants by the internal combustion engine can be massively reduced.

In internal gas combustion engines having a cylinder with a relatively large displacement, the concept of a gas-flushed prechamber is used wherein the main combustion chambers are provided with a lean gas-air mixture and pure gas is provided to the prechambers via prechamber gas valves. During a compression stroke, the lean gas-air mixture is pressed from the main combustion chamber into the prechamber to form a gas-air mixture as the prechamber charge with $\lambda$ of about 1 at the time of ignition. The prechamber charge is ignited by an ignition source (e.g., a spark plug), and ignition torches protruding from the prechamber into the main combustion chamber ignite the lean gas-air mixture present in the main combustion chamber.

EP 3 303 804 B1 discloses an internal combustion engine having the following features:
  at least one cylinder head;
  an intake manifold;
  a plurality of piston-cylinder-units in which pistons are movably arranged;
  a plurality of main combustion chambers, wherein each main combustion chamber is formed in a cylinder by a piston and at least one cylinder head;
  a plurality of intake ports, wherein each intake port is connected to one of the main combustion chambers and to an intake manifold;
  a plurality of prechambers, wherein each prechamber is connected to one of the main combustion chambers and is provided with a prechamber gas valve, an ignition device and a source for a gas-air mixture, which is formed by the intake port of the main combustion chamber to which the prechamber is connected and a connection line provided between the intake port and the prechamber gas valve; and
  an electronic control unit configured to control a lambda $\lambda$ of the gas-air mixture provided to the intake ports or the intake manifold.

US 2014/083 391 A1 shows a prechamber, which includes an ignition region and a flow transfer region, which is delimited from the ignition region by an intermediate wall, wherein the fuel-air mixture can be fired in the ignition region and the flow transfer passage opens into the flow transfer region and there is provided an air feed passage, wherein—preferably compressed—air can be fed to the flow transfer region by way of the air feed passage. Fuel gas is provided into the ignition region and air is fed into to flow transfer region. Therefore, this prior art shows a prechamber, which is flushed separately with air and gas, not with a mixture of fuel gas and air.

BRIEF DESCRIPTION

Embodiments of the invention include an internal combustion engine having prechambers of the fuel-gas-air-mixture flushed type with improved ignition performance and stability.

This improved ignition performance and stability may be achieved by an internal combustion engine having the features described and claimed below. For example, certain embodiments of the invention are defined by the independent and dependent claims.

An embodiment of an internal combustion engine has:
  at least one cylinder head;
  an intake manifold;
  a plurality of piston-cylinder-units in which pistons are movably arranged;
  a plurality of main combustion chambers (each main combustion chamber is formed in a cylinder by a piston and the at least one cylinder head);
  a plurality of intake ports, wherein each intake port is connected to one of the main combustion chambers and to an intake manifold;
  a plurality of prechambers, wherein each prechamber is connected to one of the main combustion chambers and is provided with a prechamber gas valve and an ignition device (the ignition timing of which can be controlled by an electronic control unit); and
  an electronic control unit configured to provide the prechamber gas valves with a mixture of fuel gas and air (i.e., a mixture of fuel gas and air exits from the prechamber gas valves).

According to certain embodiments, each prechamber has at least:
  a first sub-chamber, which is provided with the prechamber gas valve and with the ignition device;
  a second sub-chamber, which is connected to the main combustion chamber by a plurality of first orifices and which is connected to the first sub-chamber either:
  directly by a second orifice, preferably a plurality of second orifices; or
  indirectly by at least one third sub-chamber, which is connected to the first sub-chamber by a third orifice, preferably a plurality of third orifices and which is connected to the second sub-chamber by a second orifice, preferably a plurality of second orifices.

In certain embodiments, the concept of a mixture flushed prechamber, which is formed by at least two cascaded sub-chambers improves ignition performance and stability.

Due to sufficient scavenging (high uniformity index, i.e., low residual gas content and low lambda variation in the considered volume) of the cascaded sub-chambers with a fresh mixture of fuel gas and air, problems with instable combustion due to burned exhaust gases in areas near the ignition device can be avoided. The ignition of the first sub-chamber is amplified by the flame torches protruding into the second sub-chamber or the third sub-chamber, respectively, and finally protruding into the main combustion chamber to which the prechamber is connected. This is beneficial for a stable and robust combustion in the main combustion chamber and improved cycle to cycle stability, i.e., although a possibly lean mixture of fuel gas and air is ignited in the first sub-chamber, due to the cascaded design, the momentum of the flame torches is sufficient to ignite the charge in the main combustion chamber efficiently.

Also, due to the flame torches entering into the other sub-chamber(s), regions with a higher flow velocity can be ignited.

It is possible to position the orifice(s) such that those regions of the second or third sub-chamber, which in the prior art could not be ignited efficiently due to high flow velocities, can now be ignited efficiently. This improves energy turn rate in the second or third sub-chamber and leads to an increase of momentum of the flame torches entering the combustion main chamber.

The advantages of mixture scavenged prechambers (low NOx emissions and lean operation capability of the internal combustion engine) are retained.

The mixture of fuel gas, air and—in some embodiments—exhaust gas can be provided to the prechambers either directly from a source separate from the intake manifold via the prechamber gas valves or the prechamber gas valves can be provided with the mixture present in the intake manifold. In the latter case, a source for a gas-air mixture is formed by:
the intake port of the main combustion chamber to which the prechamber is connected and a connection line provided between the intake port and the prechamber gas valve;
or
the intake manifold and a connection line provided between the intake manifold and the prechamber gas valve.

In a preferred embodiment of the invention, a volume of the first sub-chamber is smaller than a volume of the second pre-chamber and—if at least one third pre-chamber is provided—smaller than a volume of the at least one third pre-chamber.

In a preferred embodiment of the invention, when following a fluid passage from the first pre-chamber to the main combustion chamber to which the prechamber is connected, each sub-chamber has a smaller volume than a next sub-chamber.

In a preferred embodiment of the invention, the first sub-chamber and the second sub-chamber and—if present— the at least one third sub-chamber are formed separately from each other and are connected only by the plurality of orifices. In other words, the sub-chambers are not nested.

In a preferred embodiment of the invention, only the first sub-chamber is provided with a prechamber gas valve such that the first sub-chamber forms the only source for the second sub-chamber and—if present—the at least one third sub-chamber.

In a preferred embodiment of the invention:
a ratio of the volume of the first pre-chamber to the second pre-chamber is about 1/3 to 1/7, preferably about 1/4 to 1/6, especially preferred about 1/5 and/or if at least one third pre-chamber is provided:
a ratio of the volume of the second pre-chamber to the at least one third pre-chamber is about 1/3 to 1/7, preferably about 1/4 to 1/6, especially preferred about 1/5 and/or
a ratio of the volume of the first pre-chamber to the at least one third pre-chamber is about 1/3 to 1/7, preferably about 1/4 to 1/6, especially preferred about 1/5.

In a preferred embodiment of the invention, the first sub-chamber and/or the second sub-chamber and/or the at least one third sub-chamber, if at least one third sub-chamber is provided, comprises a riser channel which is on one end connected to a main cavity of the sub-chamber and which is on the other end connected to the plurality of orifices.

In a top view, the individual sub-chambers of all embodiments can have a circular shape.

The number of orifices between the sub-chambers and between the second sub-chamber and the main combustion chamber, respectively, can be chosen in a wide range. It can be, e.g., four or six.

The parameter lambda $\lambda$ of the gas-air mixture can be adjusted in the usual manner, e.g., by adding more or less fuel gas to the intake air in a mixing device.

In an embodiment of the invention, the electronic control unit configured to provide the intake manifold and/or the prechamber gas valves with a mixture of fuel gas, air and exhaust gas with a lambda $\lambda$ greater than 1.2, preferably greater than 1.7, (lean operation mode of the internal combustion engine).

In an alternative embodiment of the invention, the electronic control unit is configured to provide the intake manifold with a mixture of fuel gas, air and exhaust gas with a lambda $\lambda$ of approximately 1 and an exhaust gas recirculation (EGR) content of about 10% to about 45%. A stoichiometric gas-air mixture is diluted with re-circulated exhaust gas to form an ignitable mixture that is supplied to a prechamber via the prechamber gas valve and to the main chamber via the intake valves. The use of a stoichiometric mixture of fuel gas, air and exhaust gas allows the use of a three-way-catalysator in an exhaust pipe (usually downstream of a turbine of a turbocharger if one is provided) of the internal combustion engine to decrease emission of pollutants.

As is well known in the art, a stoichiometric mixture of air and fuel gas can be diluted with additional air or with recirculated (cooled) exhaust gas in order to reduce the combustion knocking tendency and thus to increase the maximum specific power output of the engine. The dilution by additional air will result in lean burn combustion, the dilution with exhaust gas however will not change the air-fuel ratio (which will stay at $\lambda=1$) and therefore enable the usage of a three-way-catalyst for pollutant reduction.

The exhaust gas recirculation rate (EGR rate) of the mixture of air, fuel gas and exhaust gas in the intake manifold (in per cent) is defined by the formula:

$$x_{EGR} \ [\%] = \frac{m_{EGR}}{m_{tot}} \cdot 100$$

with $m_{EGR}$ denoting mass of the recirculated exhaust gas and $m_{tot}$ denoting total mass of the mixture of air, fuel gas and recirculated exhaust gas.

The EGR content $x_{EGR}$ of the mixture of air, fuel gas and exhaust gas in the intake manifold and the intake ports can be adjusted by an external exhaust gas re-circulation in the usual manner, e.g., by adding more or less recirculated exhaust gas to the air or the air-fuel mixture in an EGR mixing device.

The ignition device can be in the form of a spark plug.

In a preferred embodiment of the invention, there is at least one turbocharger to provide pressurized mixture (air-EGR or air-fuel gas-EGR) to the intake manifold. In this embodiment, it is provided for that the connection lines to the prechamber branch off from the intake manifold or the intake ports between the turbocharger and inlet valves of the main combustion chambers.

In a preferred embodiment of the invention, the electronic control unit is configured to provide the intake ports with a gas-air mixture with a lambda $\lambda$ between about 0.95 and 1.05.

In a preferred embodiment of the invention, the electronic control unit is configured to provide recirculated exhaust gas to the main chambers and prechambers such that the EGR content is between about 10% and about 45%.

It can be provided that the fuel gas is supplied either by means of a gas mixer upstream of the compressor of the turbocharger or by means of port fuel injection valves positioned downstream of the compressor of the turbocharger.

In a preferred embodiment of the invention, the recirculated exhaust gas is provided to the main chambers and prechambers by an EGR system that connects the exhaust system to the intake system via an EGR mixing device, which can be controlled by the electronic control unit via an EGT control device.

It can be provided that inlet and outlet valves of the main combustion chambers are actuated by an actuator, which is controlled by the electronic control unit such that an inlet valve closes before the piston reaches a lower dead center position. This ensures the complete flushing of the prechambers through the still retracting pistons. However, it is preferred, in certain embodiments, that this motion of the inlet and outlet valves is controlled not electronically but by a camshaft.

In an embodiment of the invention, which uses a mixture of fuel gas and air with a $\lambda$ about 1, a three-way-catalyst is arranged in an exhaust pipe of the internal combustion engine (usually downstream of the turbine of a turbocharger if one is provided).

In a preferred embodiment of the invention, a ratio of a volume of a prechamber to a compression volume of the main combustion chamber, to which the prechamber is connected in an upper dead center of a piston movement, ranges from about 0.5%-about 4%.

In a preferred embodiment of the invention, the connection lines are formed as cavities in the cylinder head.

A tempering device can be provided for each connection line in order to prevent condensation of the gas-air mixture provided to the prechambers.

An optional aperture can be provided for each connection line in order to decouple the prechambers from pressure pulsations in the intake ports.

The disclosed embodiments can be used irrespective of a piston shape, e.g., in connection with flat pistons or pistons with bowls.

It is preferred, in certain embodiments, that the number of sub-chambers is the same for each prechamber of the plurality of prechambers of a given internal combustion engine.

The internal combustion engine is preferably formed as a stationary gas motor, which preferably is coupled to an electrical generator to generate electrical power or to a drive shaft to generate mechanical power (e.g. to drive a compressor).

BRIEF DESCRIPTION OF THE DRAWINGS

Embodiments of the invention are discussed with respect to the Figures:

FIG. 1 shows a detail of a first embodiment of the invention.

FIG. 2 shows a detail of a second embodiment of the invention.

FIG. 5 shows a single piston-cylinder-unit of the internal combustion engine of FIG. 4.

DETAILED DESCRIPTION

Figure 3A:
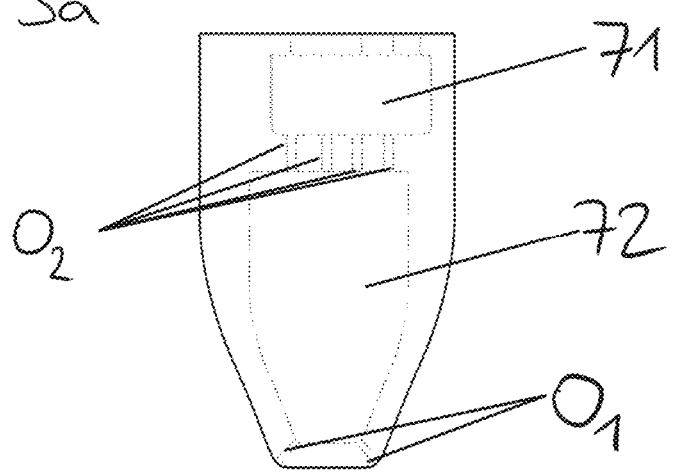
FIG. 3$a,b$ show a detail of a third and fourth embodiment of the invention.

FIG. 1 shows a detail of a first embodiment of an internal combustion engine 1 according to the invention, namely one of the plurality of prechambers 7 which—in this embodiment—has a first sub-chamber 71 which is provided with the prechamber gas valve 8 and with an ignition device 9 (e.g., spark plug) and a second sub-chamber 72 which is connected to a main combustion chamber 5 of the internal combustion engine 1 (not shown here but see FIGS. 4 and 5) by a plurality of first orifices Oi and which is connected to the first sub-chamber 71 by a plurality of second orifices 02. In this embodiment, an optional riser channel 27 is provided in the second sub-chamber 72.

It is important that according to embodiments of the invention, an electronic control unit 19 of the internal combustion engine 1 (see FIG. 4) is configured to provide the prechamber gas valve 8 with a mixture of fuel gas and air not with either pure fuel gas or pure air. It is preferred, although not essential for embodiments of the invention, that only the first sub-chamber 71 (the one provided with the ignition device 9) is provided with a prechamber gas valve 8 such that the first sub-chamber 71 forms the only source for the second sub-chamber 72. It is also preferred, in certain embodiments, that—as shown—the first sub-chamber 71 and the second sub-chamber 72 are formed separately from each other and are connected only by the plurality of orifices $O_1$, $O_2$. In other words, the sub-chambers 71, 72 are not nested.

The prechamber 7 shown in FIG. 2 differs from the one shown in FIG. 1 only in that a third sub-chamber 73 is provided between the first sub-chamber 71 and the second sub-chamber 73. is the third sub-chamber 73 is connected to the first sub-chamber 71 by a plurality of third orifices $O_3$ and to the second sub-chamber 72 by a plurality of second orifices $O_2$. All other information given above with respect to FIG. 1 can also be applied to FIG. 2 with the understanding that the third sub-chamber 73 is present.

Figure 3B:
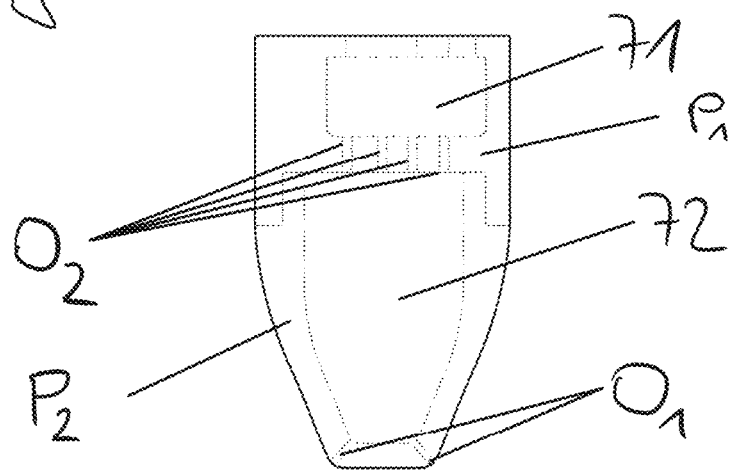

FIG. 3$a$ shows a third embodiment of the invention in a detailed view of a prechamber 7, which has a first sub-chamber 71 and a second sub-chamber 72, which are both formed in a single component. The gas valve 8 and the ignition device 9 are not shown, but openings for partially receiving these devices can be seen.

Figure 4:
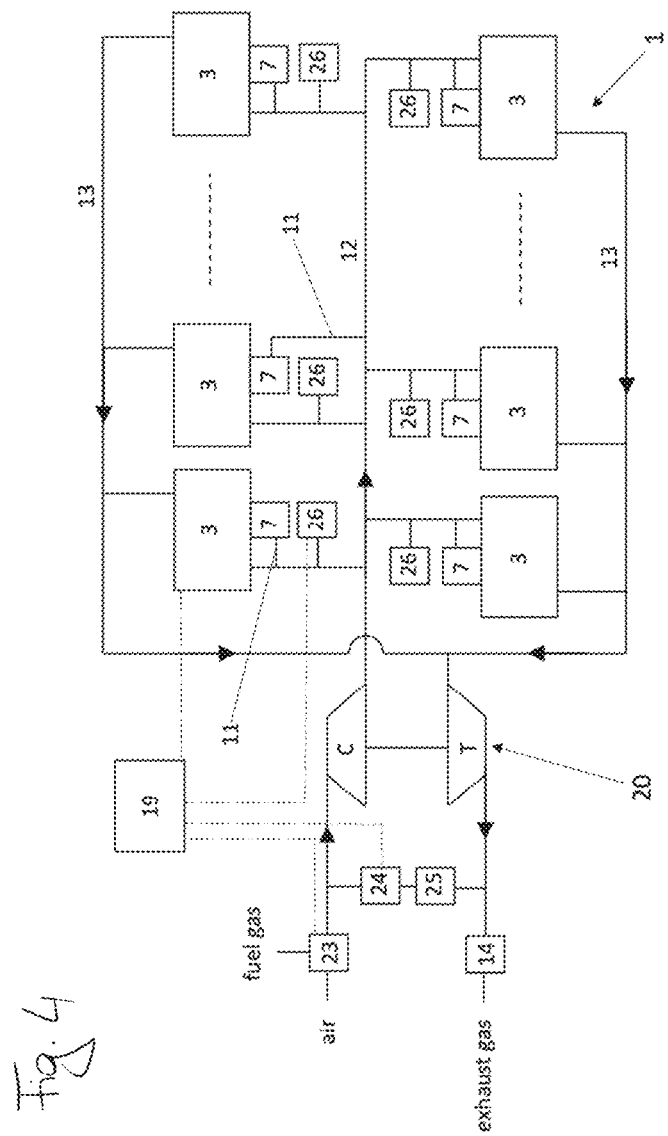
FIG. 4 shows an internal combustion engine 1 according to the invention.

The fourth embodiment of FIG. 3$b$ differs from the third embodiment of FIG. 3$a$ only in that here the component in which the first sub-chamber 71 and the second sub-chamber 72 are formed is made of two pieces $P_1$ and $P_2$, which are easier to manufacture. In this example, in the first piece $P_1$ the first sub-chamber 71 and the plurality of second orifices $O_2$ are formed; in the second piece $P_2$ the second sub-chamber 72 and the plurality of first orifices $O_1$ are formed FIG. 4 shows an embodiment of the internal combustion engine 1:

The internal combustion engine 1 has a cylinder head 2 (in reality two cylinder heads 2 in V configuration but only one is shown), a plurality of piston-cylinder-units 3 in which pistons 4 are movably arranged, and a plurality of main combustion chambers 5, wherein each main combustion chamber 5 is formed in a cylinder 6 by a piston 4 (cf. FIG. 5) and the cylinder head 2.

A plurality of intake ports 10 is provided wherein each intake port 10 is connected to one of the main combustion chambers 5.

A plurality of prechambers 7 is provided wherein each prechamber 7 is connected to one of the main combustion chambers 5 and is provided with a prechamber gas valve 8, an ignition device 9 (the ignition timing of which can be controlled by an electronic control unit 19), and a source for a mixture of fuel gas, air and exhaust gas. The prechambers 7 are designed according to embodiments of the invention with at least two sub-chambers 71, 72, in particular, as shown in the embodiments of FIGS. 1 to 3.

The source for a mixture of fuel gas, air and exhaust gas is formed by the intake port 10 of the main combustion chamber 5 to which the prechamber 7 is connected (shown as an example for all of the prechambers 7 but one) or the intake manifold 12 (shown as an example with respect to the prechamber 7 which is situated second from left in the upper region of FIG. 4) and a connection line 11 provided between the intake port 10 or the intake manifold 12 and the prechamber gas valve 9. Of course, other than shown in FIG. 1, it will be preferred, in certain embodiments, to connect the connection lines 11 of all prechambers 7 either to the intake port 10 or the intake manifold 12.

In FIG. 4, a mixing device 23 for air and fuel gas and port fuel injection valves 26 are shown together. It is of course preferred, in certain embodiments, to use either a mixing device 23 or port fuel injection valves 26.

The electronic control unit 19 (dashed command lines are shown only with respect to a single piston-cylinder-unit 3 but are of course provided with respect to all of them) is configured to provide the intake manifold 12 with a mixture of fuel gas, air and exhaust gas via a fuel gas-air mixing device 23 with a lambda λ of at approximately 1 and via an external exhaust gas re-circulation (external EGR) mixing device (having an EGR control device 24 controlled by the electronic control unit 19 and an EGR cooler 25) with $x_{EGR}$ of approximately 10% to 45%. Provision of EGR is of course optional, because embodiments of the invention work with all types of combustion control provided there are prechambers 7 flushed with a mixture of fuel gas and air and having at least two sub-chambers 71, 72.

In this embodiment, the main chamber and prechamber charge is controlled to have a lambda λ of approximately 1 (preferably between about 0.95 and 1.05) and a recirculated exhaust gas content $x_{EGR}$ of about 10% to about 45%, preferably between about 10% and about 45%, more preferably about 15% and 40%. It should be noted that, in certain embodiments, the concept of prechambers 7 flushed with a mixture of fuel gas and air and having at least two sub-chambers 71, 72 can be used irrespective of the question of the value of lambda λ.

If a turbocharger 20 is provided, exhaust gas is provided upstream of a compressor C of the turbocharger 20.

In this embodiment, the internal combustion engine 1 is provided with at least one turbocharger 20 (having a compressor C and a turbine T) to provide pressurized mixture (air-EGR or air-fuel gas-EGR) to the intake manifold 12. The connection lines 11 branch off from the intake manifold 12 or the intake ports 10 between the turbocharger 20 and inlet valves 15 of the main combustion chambers 5.

Inlet and outlet valves 15, 16 of the main combustion chambers 5 are actuated by an actuator 22 (which might optionally be controlled by the electronic control unit 19), such that an inlet valve 15 closes before the piston 4 reaches a lower dead center position. It is however preferred, in certain embodiments, to control this motion of the inlet and outlet valves 15, 16 without the electronic control unit 19 via a camshaft.

A three-way-catalysator 14 is arranged preferably downstream of the turbocharger turbine T in the exhaust manifold 13.

As an example, a ratio of a volume of a prechamber 7 to a compression volume of the main combustion chamber 5 to which the prechamber 7 is connected in an upper dead center of a piston movement ranges from about 0.5% to about 4%.

As an example, the connection lines 11 are formed as cavities in the cylinder head 2.

A tempering device 17 and a throttle 21 can be provided for each connection line 11.

An aperture 18 can be provided for each connection line 11 in order to decouple the prechambers 7 from pressure pulsations in the intake ports 10 or the intake manifold 12.

Although FIG. 4 shows an embodiment of the invention using EGR, this is not an essential feature of the invention and it would be possible to either run the embodiment shown in FIG. 4 with $x_{EGR}$ of 0% or to use an embodiment without an exhaust gas re-circulation device. If no EGR is used, a lean operation mode of the internal combustion engine 1 is preferred in certain embodiments.

LIST OF REFERENCE SIGNS 1 internal combustion engine
2 cylinder head
3 piston-cylinder-unit
4 piston
5 main-combustion chamber
6 cylinder
7 prechamber
71 first sub-chamber
72 second sub-chamber
73 third sub-chamber
8 gas valve
9 ignition device
10 intake port
11 connection line
12 intake manifold
13 exhaust manifold
14 three-way-catalysator
15 inlet valve
16 outlet valve
17 tempering device
18 aperture
19 electronic control unit
20 turbocharger
21 throttle
22 actuator
23 mixing device
24 EGR control device of external exhaust gas re-circulation 25 EGR cooler of external exhaust gas re-circulation
26 port fuel injection valve
27 riser channel
28
$O_1$ first plurality of orifices
$O_2$ second plurality of orifices
$O_3$ third plurality of orifices
$P_1$ first part
$P_2$ second part
C compressor of turbocharger
T turbine of turbocharger

The invention claimed is:

1. An internal combustion engine having:
at least one cylinder head;
an intake manifold;
a plurality of piston-cylinder-units each having a piston movably arranged in a cylinder;
a plurality of main combustion chambers;
a plurality of intake ports, wherein each intake port of the plurality of intake ports is connected to one of the plurality of main combustion chambers and to the intake manifold;
a plurality of prechambers, wherein each prechamber of the plurality of prechambers is connected to one of the plurality of main combustion chambers and is provided with a prechamber gas valve and an ignition device;
an electronic control unit configured to provide the prechamber gas valves with a mixture of fuel gas and air;
wherein each prechamber of the plurality of prechambers has a plurality of sub-chambers, comprising:
a first sub-chamber having the prechamber gas valve and the ignition device;
a second sub-chamber connected to the main combustion chamber by a plurality of first orifices; and
at least one third sub-chamber, wherein the second sub-chamber is connected to the first sub-chamber indirectly by the at least one third sub-chamber, wherein the at leach one third sub-chamber is connected to the first sub-chamber by at least one third orifice, and the at least one third sub-chamber is connected to the second sub-chamber by at least one second orifice;
wherein following a fluid passage from the first prechamber to the main combustion chamber to which the prechamber is connected, each sub-chamber of the plurality of sub-chambers has a smaller volume than a next sub-chamber of the plurality of sub-chambers.

2. The engine of claim 1, wherein the at least one third sub-chamber comprises a plurality of third sub-chambers disposed between the first and second sub-chambers.

3. The engine of claim 1, wherein
a ratio of the first volume of the first pre-chamber to the second volume of the second pre-chamber is about 1/3 to 1/7; or
a ratio of the second volume of the second pre-chamber to a third volume of the at least one third pre-chamber is about 1/3 to 1/7; or
a ratio of the first volume of the first pre-chamber to the third volume of the at least one third pre-chamber is about 1/3 to 1/7, or a combination thereof.

4. The engine of claim 1, wherein the prechamber gas valve is coupled to a source for a gas-air mixture.

5. The engine of claim 1, wherein at least one sub-chamber of the plurality of sub-chambers comprises a riser channel, wherein a first end of the riser channel is connected to the at least one sub-chamber and a second end of the riser channel is connected to an adjacent sub-chamber of the plurality of sub-chambers through a plurality of orifices.

6. The engine of claim 1, wherein the at least one second orifice comprises a plurality of second orifices, wherein the at least one third orifice comprises a plurality of third orifices, wherein the first sub-chamber, the second sub-chamber, and the at least one third sub-chamber are formed separately from each other and are connected only by the plurality of second and third orifices.

7. The engine of claim 1, wherein only the first sub-chamber is provided with the prechamber gas valve.

8. The engine of claim 1, wherein the electronic control unit configured to provide the intake manifold and/or the prechamber gas valves with a mixture of fuel gas, air, and exhaust gas with a lambda ($\lambda$) greater than 1.2.

9. The engine of claim 1, comprising an external exhaust gas re-circulation to the intake manifold, wherein the electronic control unit is configured to provide the intake manifold with a mixture of fuel gas, air, and exhaust gas with:
a lambda ($\lambda$) of approximately 1; and
an exhaust gas recirculation (EGR) content of about 10% to about 45%.

10. The engine of claim 9, wherein the electronic control unit is configured to provide the EGR content between about 15% and about 40%.

11. The engine of claim 9, comprising a three-way-catalysator arranged in an exhaust manifold of the internal combustion engine downstream or upstream of a turbine of a turbocharger.

12. The engine of claim 1, wherein the fuel gas is supplied either by a gas mixer upstream of a compressor of a turbocharger or by port fuel injection valves positioned downstream of the compressor of the turbocharger.

13. The engine of claim 4, wherein the internal combustion engine comprises at least one turbocharger and the connection lines branch off from the intake ports or the intake manifold between the turbocharger and inlet valves of the main combustion chambers.

14. The engine of claim 1, wherein the diameters of the cylinders are above 140 mm.

15. The engine of claim 1, wherein inlet and outlet valves of the plurality of main combustion chambers are actuated by a camshaft or an actuator controlled by the electronic control unit such that an inlet valve closes before the piston reaches a lower dead center position for each of the plurality of piston-cylinder-units.

16. The engine of claim 1, wherein a ratio of a volume of a prechamber to a compression volume of the main combustion chamber coupled to the prechamber in an upper dead center of a piston movement ranges from about 0.5% to about 4%.

17. The engine of claim 4, wherein the connection lines are formed as cavities in the cylinder head.

18. A system, comprising:
a prechamber of an internal combustion engine, wherein the prechamber comprises:
a body;
a plurality of sub-chambers disposed in the body, wherein each pair of adjacent sub-chambers of the plurality of sub-chambers are fluidly coupled together via a plurality of orifices; and
a fluid path through the plurality of sub-chambers in a sequence from a first sub-chamber toward a main combustion chamber of the internal combustion engine, wherein the plurality of sub-chambers progressively increase in volume from one sub-chamber to another in the sequence from the first sub-chamber toward the main combustion chamber.

19. The system of claim 18, wherein the plurality of sub-chambers comprise at least three sub-chambers that progressively increase in volume from one sub-chamber to another in the sequence from the first sub-chamber toward the main combustion chamber.

20. A method, comprising:
controlling operation of a prechamber of an internal combustion engine, wherein the prechamber comprises:
a body;
a plurality of sub-chambers disposed in the body, wherein each pair of adjacent sub-chambers of the plurality of sub-chambers are fluidly coupled together via a plurality of orifices; and
a fluid path through the plurality of sub-chambers in a sequence from a first sub-chamber toward a main combustion chamber of the internal combustion engine, wherein the plurality of sub-chambers progressively increase in volume from one sub-chamber to another in the sequence from the first sub-chamber toward the main combustion chamber.

21. The method of claim 20, wherein the plurality of sub-chambers comprise at least three sub-chambers that progressively increase in volume from one sub-chamber to another in the sequence from the first sub-chamber toward the main combustion chamber.

\* \* \* \* \*